May 8, 1962  A. GIROUD-ABEL  3,032,915

TOXIC BAIT

Filed Jan. 27, 1959

INVENTOR

ANDRÉ GIROUD-ABEL

BY Toulmin & Toulmin

ATTORNEYS

United States Patent Office 3,032,915
Patented May 8, 1962

3,032,915
TOXIC BAIT
André Giroud-Abel, Lyon, France, assignor to
Societe Lipha, Lyon, France
Filed Jan. 27, 1959, Ser. No. 789,310
1 Claim. (Cl. 43—131)

This invention relates to toxic bait for the destruction of rodents and the like animals.

It is customary in campaigns for the destruction of rodents to lay out poisoned bait in the form of poisoned grains of wheat, corn, barley, or the like other food.

However, experience has shown, that many animals in particular rats and mice often seem to remain unattracted by these poisoned grains, while they will attack bags stored nearby and containing grain, tearing open a piece of the wrapping and eating the grain from the bags. Furthermore, poisoned grain laid out in storage rooms, cellars and the like locations is liable to become spoilt in time due to climatic influences. Once the rodents inhabiting the respective building have become accustomed to the fact that the poisoned bait is in a deteriorated state, for instance, moldy, they will then avoid freshly laid bait.

It is therefore an object of my invention to provide poisonous bait, which is attractive for rodents and the like animals and can be laid out practically indefinitely without becoming deteriorated by atmospheric influences.

Figure 1:
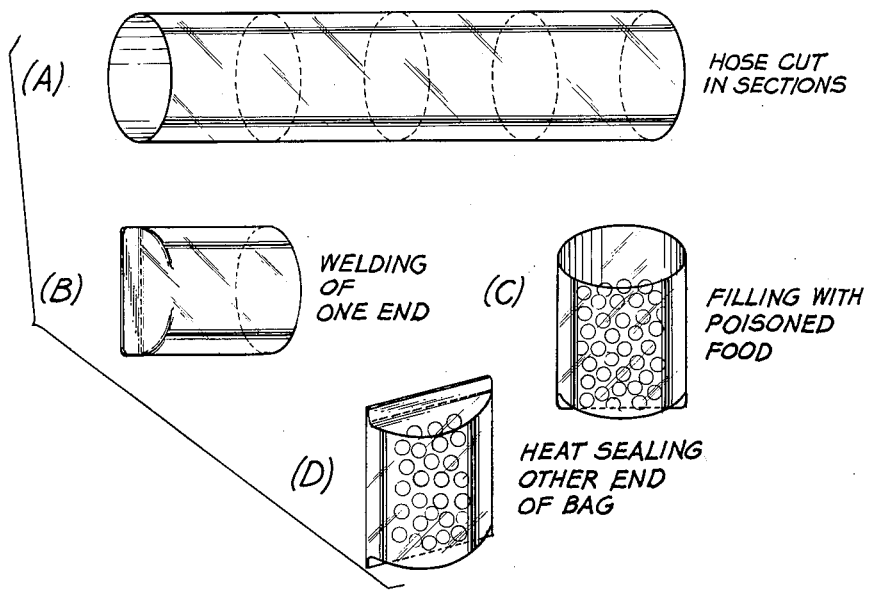
Figure 2:
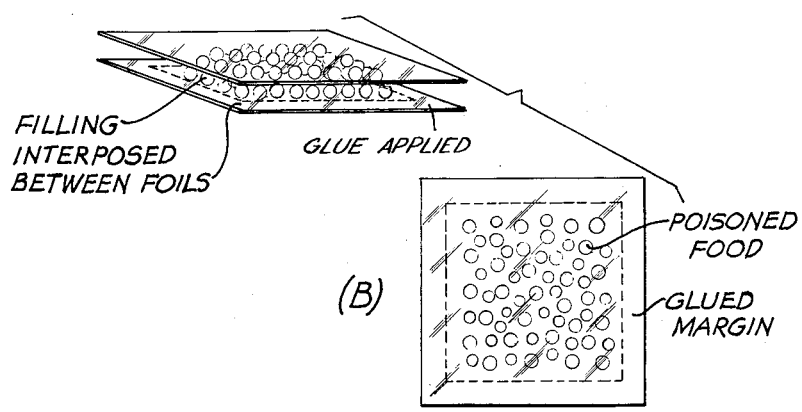

To attain this object, reference is directed to the attached self-explanatory drawing wherein:

FIGURES 1A to 1D illustrate the manufacture of a bait according to the invention from a hose of plastic material and FIGURES 2A and 2B illustrate the manufacture of a similar bait from pieces of rectangular plastic foil or the like material.

Explaining my invention in detail, the previously mentioned drawbacks of the known type of bait are avoided by my invention which provides for a bait consisting of poisoned food such as grain, pieces of cheese and the like sealed hermetically in an envelope which is at the same time of sufficient mechanical and chemical strength to hold and preserve the bait therein, which is impermeable to water so that the food in the interior of the envelope is not affected by humidity of the surroundings in which the bait is placed, but which envelope is at the same time pervious to the specific natural, fresh smell or perfume of the food sealed in the envelope. Furthermore, as an important feature of the invention the envelope is of a material of such quality and thickness that the food contained therein is easily perceived by the animals to be destroyed, in particular rodents, and can be easily torn open by these animals.

These properties of the envelope of the bait according to the invention thus take advantage of the urge of rodents and the like animals to tear open bags enclosing food, while preserving the food at all times fresh and attractive with regard to both its appearance and its odor.

The envelope in which the poisoned food is to be sealed may consist of quite a number of different materials such as special chemically treated paper such as sulfuric acid-treated paper or paraffinated paper, various plastic materials such as polyethylene, polyamide, polyvinyl chloride, cellophane foils and the like, all of which can be used as long as they fulfill the above-listed conditions as to their properties.

Complexes of polyethylene and aluminum, or of paper and polyvinyl chloride may also be used.

The thickness of the foils may range from above 10 microns to 100 microns and preferably from 40 to 80 microns if plastic materials are used. If paper is used, the thickness may correspond preferably to a paper weight of from 20 to 100 grams per square meter.

As a preferred material, I use envelopes constituted by a short section of polyethylene hose cut to the desired size, closed by heat-welding first at one end, then filled with the poisoned food, and then sealed hermetically by heat-welding the other end. Instead of using a hose-shaped starting material, the envelope may, of course, also be formed by heat-welding together the four seams of two rectangular polyethylene foils. In both cases a small, food-filled cushion having a polyethylene cover is formed.

It will be easily understood that the shape, the color, the stiffness and the dimensions of the envelope may be varied as desired, always subject to the above-mentioned conditions. In particular, the foil forming the envelope must be sufficiently thin to permit rodents to bite through the same and tear it open, and to permit passage through the foil of the attractive smell of the food contained therein.

The envelope can be hermetically sealed by the above-mentioned heat-welding, or by glueing or clamping the seams together. Of course, the resultant closure must always be sufficiently tight to prevent the penetration of moisture into the interior of the envelope.

Since it is well known that hermetically sealed food can be preserved for a long time, if wrapped under certain conditions well known in the art of preserving foods, the poisoned food used as a filling for the envelope can be chosen from a great variety of foodstuffs. Among these are bread, dried meat, dried fish, bacon, oil seeds, cereal grains, alone or in mixture with each other, which food is admixed or impregnated with mineral or vegetal poisons, microbic cultures or anticoagulant agents.

My invention will be further illustrated by a number of examples to show how the same can be easily realized in practice. It will, of course, be understood that these examples are in no way limitative of the scope of my invention.

*Example I*

100 kilograms (kg.) of crushed pearl barley (groats) are dried and then admixed to 15 liters of an aqueous solution containing in the aforesaid volume of liquid 50 grams of naphthyl-indane-dione
10 grams of rhodamine
50 grams of an aqueous sodium hydroxide solution containing 30% by weight of NaOH and permitted to absorb the maximum of this liquid. The liquid saturated grains are then separated from the excess liquid, if any, by sieving and dried at a temperature of 80° C. in a current of hot air.

Portions of 25 grams of the dried grains are then filled in bags of 50 by 50 millimeters size and made of conventional translucent polyethylene having a thickness of 50 microns. The bags are hermetically sealed by heating the seams to 110° C. in a conventional manner. The bait is then ready for use.

*Example II*

100 kg. of whole grains of wheat are placed in a mixer and 5 liters of a paraffin oil. The grains are then powdered with a mixture consisting of 25 grams of warfarin, manufactured by Société des Produits Chimiques de Bezons, Bezons, France
50 grams of rhodamine
1,000 grams of talcum.

The entire mass is then thoroughly mixed and grains having a concentration of toxic ingredients amounting to about 1:4,000 parts by weight are obtained.

The grains are then filled in batches of 25 grams into polyethylene bags of 50 by 50 millimeters size and a foil thickness of 50 microns.

The bags are sealed by heat-welding the seams in a conventional manner.

Example III

In a mixer 90 kg. of wheat flour, 10 kg. of powdered sungar and a toxic mixture containing 50 grams of Radione, manufactured by Lipha, Lyon, France
50 grams of Rhodamine and
1,000 grams of talcum are thorughly mixed.

The flour then contains Radione, which is 2-(alpha)-naphthyl-indane-dione-1,3 of the structural formula:

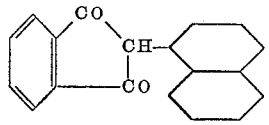

in a ratio by weight of 1:2,000.

The flour may be dyed with a conventional red aniline dye, legally prescribed in France to indicate the toxicity of the product, and added in amounts of 0.1 gram to the above-described mixture.

The toxic product is then filled in batches of 50 grams into polyvinyl chloride bags having a size of 50 by 100 millimeters and a foil thickness of 80 microns.

The bags are hermetically sealed by hot-welding their margins in a conventional manner.

Example IV

Example III is repeated, but instead of the toxic mixture used therein, 1 kg. of zinc phosphide $Zn_3P_2$ is used as the toxic agent. The toxic food is then filled in batches of 50 grams into bags of a size of 50 by 100 millimeters made of transparent sulfuric acid-treated paper sold under the name of papier sulfurisé, and manufactured by Etablissements prot, Paris, France, having a thickness corresponding to 40 grams per square meter.

The bags are closed by glueing their margins together with a cellulosic glue, sold under the name of Bericol 405 and manufactured by the Société Bericol, Lyon, France.

Example V

Example I is repeated, but the toxic product is filled in batches of 50 grams into bags having a size of 50 by 100 millimeters and made of Rilsan, a polyamide foil manufactured by Société Organico 23, Avenue Franklin Roosevelt, Paris 8°, and having a thickness of 40 microns.

Example VI

Example I is repeated, but the bags consist of a paper-polyvinyl chloride complex manufactured by Etablissements Trentesaux Toulemonde, Tourcoing, France, and sold under the name of Termoglia, having a thickness corresponding to 90 grams per square meter.

Example VII

Example II is repeated, but the bags consist of transparent paraffinated paper having a thickness corresponding to 40 grams per square meter, and manufactured by Etablissements Prot, Paris, France. This paper is sold under the name papier paraffiné.

The bags are sealed in the manner described in Example IV.

Example VIII

Example III is repeated, however, the bags are made of cellophane manufactured by "LaCellophane," Paris, France. After filling the bags are hermetically sealed by heat-welding the seams in a conventional manner.

Example IX

Example III is repeated, however the bags consist of an aluminum-polyethylene complex sold under the name of Alufix laqué, and manufactured by Etablissements prot, Paris, France; the bags are sealed in a conventional manner by heat-welding their seams.

I have found that bait sealed in packages according to the invention strongly attracts noxious animals and in particular rodents. It is a special advantage of the bait according to the invention that cats or dogs are not tempted to open the same. Only rats or mice or similar undesirable animals will tear holes in the bags and eat the food exposed thereby. One reason for this discriminatory effect may be that the food odor permitted to pass through the bags according to the invention is too weak to be perceptible to human beings or domestic animals, while it is perceived by rats and the like animals. In addition, it appears that the work required of the rodents to tear open the bags makes the food particularly attractive in appealing to the destructive instinct of these animals.

I have carried out a number of tests which indicate that the above explanation is correct.

TEST A

Five grey rats (Rattus Norvegicus) are placed in a cage and provided with abundant food to which they have been accustomed. Furthermore five polyethylene bags of bait according to the invention prepared as described in Example II above, are placed in the cage.

On the second following day, four bags were found to be completely torn apart and the contents had been eaten. Three new bags were placed in the cage. On the third following day, all three bags were torn open and the contents devoured. Three new bags were placed in the cage. On the next day, no bags were devoured, but the spilt grains were eaten up. On the next following day a first rat was found dead of hemorrhage. On the sixth following day another rat had died of hemorrhage, and on the seventh day the remaining three rats were dead.

TEST B

Two black rats (Rattus Frugivorus) are placed in a cage with an abundance of food to which they are accustomed. Moreover, three bags produced according to Example II are placed in the cage. Two days later it was found that the three bags were completely torn apart and the contents devoured. Three new bags were placed in the cage. On the third day after, one of the new bags was devoured. On the fifth day of the beginning of the test, no further bag was devoured, but the grains spilt in the cage had been completely consumed. On the sixth day a further bag was devoured.

On the seventh day the two black rats had died of multiple hemorrhage.

It will be understood that this invention is susceptible to further modification and, accordingly, it is desired to comprehend such modifications within this invention as may fall within the scope of the appended claim.

What I claim is:

A device for the extermination of rodents, comprising a hermetically sealed envelope containing about 25–50 g. of poisonous bait, said envelope consisting of a single film of polyethylene, said film being about 40–80 microns in thickness and being resistant to chemical and mechanical influences in order to contain the poisonous bait without involving hazards, being impermeable to moisture, being easily tearable by rodents, being sufficiently transparent to permit a rodent to see the poisonous bait, and permitting passage of a sufficiently strong odor of the poisonous bait to attract rodents, but not strong enough to be detected by human beings and domestic animals, said envelope having dimensions of about 50 mm. by 50–100 mm. so as to permit a rodent to transport said envelope to its habitat, whereby the rodent is exterminated due to its avaricious and destructive habits.

References Cited in the file of this patent

UNITED STATES PATENTS

| | | |
|---|---|---|
| 1,898,621 | Ferguson | Feb. 21, 1933 |
| 2,270,603 | Ridder | Jan. 20, 1942 |
| 2,349,672 | Nielson | May 23, 1944 |
| 2,716,305 | Schutte | Aug. 30, 1955 |
| 2,921,401 | Kawamura | Jan. 19, 1960 |